United States Patent
Taheri et al.

(10) Patent No.: US 12,299,989 B2
(45) Date of Patent: May 13, 2025

(54) MONITORING PRESENCE OR ABSENCE OF AN OBJECT USING LOCAL REGION MATCHING

(71) Applicant: ObjectVideo Labs, LLC, Tysons, VA (US)

(72) Inventors: Sima Taheri, McLean, VA (US); Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 371 days.

(21) Appl. No.: 17/721,667

(22) Filed: Apr. 15, 2022

(65) Prior Publication Data

US 2022/0335725 A1 Oct. 20, 2022

Related U.S. Application Data

(60) Provisional application No. 63/175,294, filed on Apr. 15, 2021.

(51) Int. Cl.
*G06V 10/82* (2022.01)
*G06N 3/08* (2023.01)
(Continued)

(52) U.S. Cl.
CPC ............ *G06V 20/52* (2022.01); *G06V 10/25* (2022.01); *G06V 10/46* (2022.01); *G06V 10/7715* (2022.01); *G06V 20/20* (2022.01)

(58) Field of Classification Search
None
See application file for complete search history.

(56) References Cited

U.S. PATENT DOCUMENTS

| | | | | |
|---|---|---|---|---|
| 7,903,141 B1 * | 3/2011 | Mariano | ............... | G06V 20/52 382/103 |
| 11,651,456 B1 * | 5/2023 | Day | ..................... | G06V 20/40 705/314 |

(Continued)

OTHER PUBLICATIONS

Al Mansur et al., "Recognition of Plain Objects Using Local Region Matching," IEICE TRANS. INF. & SYST., vol. E91-D, No. Jul. 7, 2008 (Year: 2008).*

(Continued)

*Primary Examiner* — Soo Shin
(74) *Attorney, Agent, or Firm* — Fish & Richardson P.C.

(57) ABSTRACT

Methods and systems, including computer-readable media, are described for monitoring presence or absence of an object at a property using local region matching. A system generates images while monitoring an area of the property and, based on the images, detects an object in a region of interest in the area. For each of the images: the system iteratively computes interest points for the object using photometric augmentation applied to the image before each iteration of computing the interest points. A digital representation of the region and the object is generated based on interest points that repeat across the images after each application of the photometric augmentation. Based on the digital representation, a set of anchor points are determined from the interest points that repeat across images. Using the set of anchor points, the system detects an absence or a continued presence of the object in the area of the property.

19 Claims, 5 Drawing Sheets
(1 of 5 Drawing Sheet(s) Filed in Color)

(51) Int. Cl.
    *G06T 7/00*           (2017.01)
    *G06V 10/25*         (2022.01)
    *G06V 10/46*         (2022.01)
    *G06V 10/77*         (2022.01)
    *G06V 20/20*         (2022.01)
    *G06V 20/52*         (2022.01)

(56) References Cited

U.S. PATENT DOCUMENTS

| | | | |
|---|---|---|---|
| 12,044,851 B2 * | 7/2024 | Deng | G02B 6/0011 |
| 2019/0034735 A1 * | 1/2019 | Cuban | G06V 40/16 |
| 2021/0110137 A1 * | 4/2021 | Kerzner | G06F 18/2413 |
| 2021/0374967 A1 * | 12/2021 | Ramanathan | G06T 7/194 |
| 2022/0026920 A1 * | 1/2022 | Ebrahimi Afrouzi | G06N 7/01 |
| 2022/0059132 A1 * | 2/2022 | Sun | G11B 27/28 |
| 2022/0070453 A1 * | 3/2022 | Tang | G06V 10/82 |
| 2022/0187841 A1 * | 6/2022 | Ebrahimi Afrouzi | G05D 1/0274 |
| 2023/0046840 A1 * | 2/2023 | Ramanathan | G06T 7/80 |

OTHER PUBLICATIONS

Paulin, "Of Learning Visual Representations Robust to Invariances for Image Classification and Retrieval," Artificial Intelligence [cs.AI]. Université Grenoble Alpes, 2017, English, NNT: 2017GREAM007. tel-01677852v3, submitted on Jan. 11, 2018 (Year: 2018).*

Huang et al., "Robust Image Matching By Dynamic Feature Selection," arXiv:2008.05708 (Year: 2020).*

Joglekar et al., "Image Matching with SIFT Features—A Probabilistic Approach," In: Paparoditis N., Pierrot-Deseilligny M., Mallet C., Tournaire O. (Eds), IAPRS, vol. XXXVIII, Part 3B—Saint-Mandé, France, Sep. 1-3, 2010 (Year: 2010).*

* cited by examiner

MONITORING PRESENCE OR ABSENCE OF AN OBJECT USING LOCAL REGION MATCHING

CROSS REFERENCE TO RELATED APPLICATION

This application claims the benefit of U.S. Provisional Application No. 63/175,294, filed on Apr. 15, 2021, which is incorporated herein by reference in its entirety.

FIELD

This specification relates to monitoring items using an imaging device.

BACKGROUND

Monitoring devices and sensors are often dispersed at various locations at a property, such as a home or commercial business. These devices and sensors can have distinct functions at different locations of the property. Some sensors at a property offer different types of monitoring and control functionality. The functionality afforded by these sensors and devices can be leveraged to secure items at a property, to obtain information about respective items at multiple different properties, and to control certain safety devices that may be located at the properties. Sensors and devices at a property may include one or more cameras, such as an example doorbell camera. These doorbell cameras capture images and video in response to detecting motion at property. For example, the doorbell camera can capture images and video of a visitor or owner of the property when the individual is detected at an entrance of the property.

SUMMARY

This document describes an item monitoring system that can be implemented using example devices such as a doorbell camera or related sensing device installed at a property. The system detects for human motion or motion of a robotic delivery vehicle in a region associated with a field of detection of the sensing device. The system is configured to detect that an object (e.g., a package) is present within a region or area of interest following detection of the human motion or robotic delivery vehicle in the region. The system monitors for presence and/or absence of the object using local region matching involving anchor point estimation and processing of bag-of-words, BoW, descriptors for images of, or sensing data about, the region. Using this framework, the monitoring system inspects the region for changes and determines whether the object is still there or has been removed.

One aspect of the subject matter described in this specification can be embodied in a computer-implemented method. The method includes generating multiple images in response to monitoring an area of a property and detecting, based on the multiple images, an object in a region of interest in the area. For each of the images, the method includes: iteratively computing interest points for the object based on photometric augmentation applied to the image before each iteration of computing the interest points and generating a digital representation of the region and the object based on interest points that repeat across the plurality of images after each application of the photometric augmentation. The method further includes determining, based on the digital representation, a set of anchor points from the interest points that repeat across the images; and using the set of anchor points, detecting an absence of the object in the area of the property or a continued presence of the object in the area of the property.

These and other implementations can each optionally include one or more of the following features. For example, in some implementations, determining a set of anchor points includes determining a respective set of descriptors for each anchor point in the set of anchor points. Each respective set of descriptors can represent a local region around an interest point from which the corresponding anchor point was determined. In some implementations, determining a set of anchor points from the interest points that repeat across the multiple images includes: computing a respective probability value for each of the interest points that repeat across the multiple images; aggregating interest points having a respective probability value that exceeds a threshold probability value; and determining the set of anchor points based on the aggregated interest points.

In some implementations, the method includes: determining a first bag of descriptors representing a first local region around a first anchor point for a first image of the area; and determining a second bag of descriptors representing a second local region around a second anchor point for a second image of the area. The method can include generating a first representation subspace for the first anchor point based on the first bag of descriptors; and generating a second representation subspace for the second anchor point based on the second bag of descriptors.

Detecting the absence or continued presence of the object at the property can include: performing feature matching across the first representation subspace and the second representation subspace; computing a distance value that characterizes a detected feature match between corresponding descriptors of the first representation subspace and the second representation subspace; and detecting the absence or continued presence of the object at the property based on the computed distance value. In some implementations, detecting the absence or continued presence of the object at the property includes: detecting presence and/or absence of the object based on the set of anchor points and the set of descriptors for each anchor point in the set of anchor points.

Iteratively computing interest points for the object based on photometric augmentation can include, for each image of the multiple images, performing a Scale Invariant Feature Transform (SIFT) operation on the image to obtain an interest point in the image. Performing the SIFT operation on the image can include augmenting multiple attributes of the image, including augmenting attributes of the object and one or more items depicted in the image. In some implementations, iteratively computing interest points for the object based on photometric augmentation includes: generating multiple representations of the image based on the augmenting of the multiple attributes of the image; and identifying a subset of features of the image that are repeated across the multiple representations irrespective of the augmentation performed on the image.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

In property security and smart home applications, there are scenarios in which a detected object is monitored over time to verify whether the object is still in the detected place or if the object has been removed. Examples include a package delivery scenario where a detected object, e.g., a package, placed at a front entrance or porch area of a property, is monitored. The monitoring is performed by an item monitoring system that is configured to generate a notification that is sent to a user device when the package has been picked up. The item monitoring system is operable to determine whether a package has been picked up either by a resident of the property or by a thief. The item monitoring system includes a sensing device that is configured to monitor a region at the property, such as the front entrance, and generate sensing data that includes images of the region.

The item monitoring system employs an efficient monitoring solution that employs a verification algorithm to monitor the region after a robotic or human-related activity is detected at the region. For example, the item monitoring system can include a human detector or robotic vehicle detector logic that runs locally on a surveillance camera or a doorbell camera. The item monitoring system uses the detector logic and the verification algorithm to inspect the sensing data (e.g., images), identify a region of interest where the object is located right after an event, and verify whether the region has changed based at least on the inspection of the images. Verifying whether the region has changed includes determining whether the object has been removed or determining whether there is no change in the region, indicating the object is still there.

Because the task of monitoring an item, object, or package occurs over time, an attribute of the region, such as its appearance or illumination, can change due to changes in illumination conditions or instantiations of shadows from neighboring objects. To account for these changing attributes, the disclosed monitoring solution uses the verification algorithm to implement item monitoring based on the iterative processing of local region representations and computed matching between the regions before and after a detected robotic or human-related activity (referred to alternatively as "an event").

For example, the item monitoring system monitors presence and/or absence of the object using local region matching, which involves anchor point estimation for points of interest across the region in an image and processing of bag-of-words descriptors corresponding to the different anchor points. Based on the anchor points, including local and global descriptors that contribute to selecting an anchor point, the system can construct a representation of regions that include an object (e.g., a package) within one or more images. The system 100 can then process or analyze that representation(s) to determine if the object is still present or has been removed.

Figure 1:
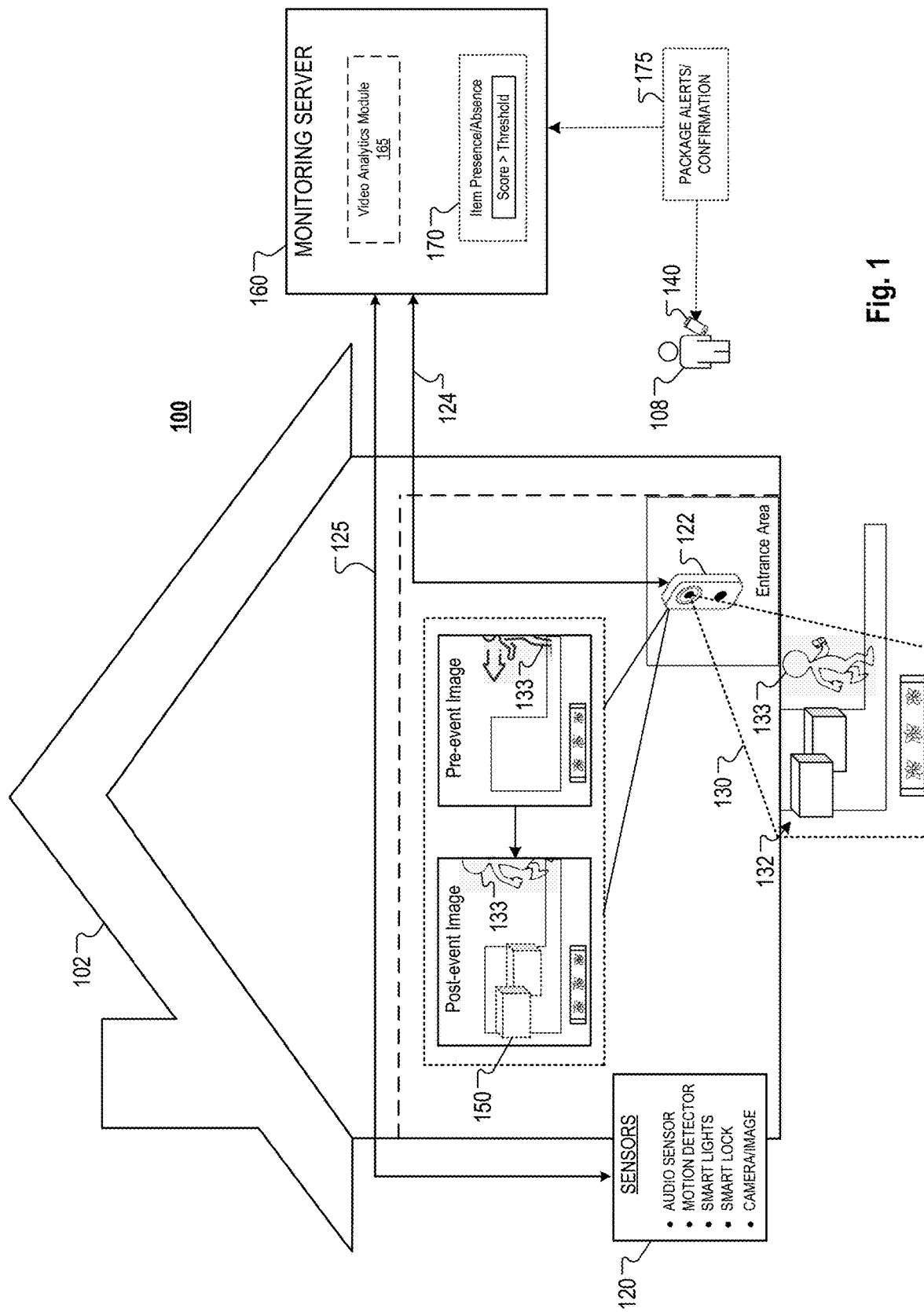
FIG. 1 is a block diagram of an example property monitoring system.

FIG. 1 shows a block diagram of an example property monitoring system 100 ("system 100") that can be used to perform one or more actions for securing a property 102 and for improving the safety of one or more occupants at the property 102. The property 102 may be, for example, a residence, such as a single-family home, a townhouse, a condominium, or an apartment. In some examples, the property 102 may be a commercial property, a place of business, or a public property, such as a police station, fire department, or military installation.

The system 100 can include multiple sensors 120. Each sensor 120 can be associated with various types of devices that are located at property 102. For example, a sensor can be associated with a video or image recording device located at the property 102, such as a digital camera or other imaging/recording device. In some implementations, a sensor(s) is operable to communicate with an imaging device and associated mechanisms that are used to determine or indicate whether items and packages have been delivered to the property or removed from a particular location of the property as well as to present status indications, including alerts and notifications, (described below) to residents or occupants at the property 102.

As described above, the property 102 is monitored by a property monitoring system. The property monitoring system can include a control unit that is used to send sensor data 125, obtained using sensors 120, to a remote monitoring server 160. The system 100 also includes an imaging device 122 (e.g., a camera) that is operable to generate image and video data that can be processed at the monitoring server 160 to monitor items at the property or to detect whether an individual has approached an entrance area of the property to deliver an item or package.

The sensors 120 can receive, via an example network at the property 102, a wireless (or wired) signal that controls operation of each sensor 120. For example, the signal can cause the sensors 120 to initialize or activate to sense activity at the property 102 and generate sensor data 125. The sensors 120 can receive the signal from monitoring server 160 or from the imaging device 122 that communicates with monitoring server 160. In addition to detecting and processing wireless signals received via the network, the sensors 120 can also transmit wireless signals that encode sensor data 125.

The monitoring server 160 receives and analyzes the sensor data 125 encoded in wireless signals transmitted by the sensors 120. For example, the monitoring server 160 analyzes the sensor data 125 encoded in the wireless signals to determine or to obtain information about activities occurring at the property 102, such as whether a person (or robotic delivery apparatus) is approaching or leaving the property 102 as well as items/packages that may be present at the property 102. As described in more detail below, the monitoring server 160 performs various functions related to processing, analyzing, or monitoring video and image data 124 as well as sensor parameter values included in the sensor data 125.

The imaging device 122 can be a security camera or a doorbell camera 122 that is configured to record or obtain images and video data. The camera 122 may be affixed or installed at an entrance of the property 102 to detect respective occurrences of individuals being within a threshold proximity of the property. The camera 122 may include a processor, a chipset, a memory system, or other computing hardware. In some cases, the camera 122 may include application-specific hardware, such as a field-programmable gate array (FPGA), an application-specific integrated circuit (ASIC), or other embedded or dedicated hardware. The camera 122 may also include software, which configures the device to perform the functions described in this document.

The camera 122 can be a computer system or other electronic device configured to communicate with the sensors 120 and the control unit to obtain image and sensor data that are indicative of events occurring at the property 102. The control unit 110 can activate a camera, lock or unlock a door/window, activate/arm an alarm system, de-activate/de-arm the alarm system, power on or off a light at the property 102, or communicate with one or more of the camera 122 and sensors 120. In some implementations, the camera 122, control units, monitoring servers, or other computing modules described herein are included as subsystems of the property monitoring system 100.

The camera or imaging device 122 can be a particular type of sensor 120 or may be a combination of different types of sensors 120. The camera 122 is configured to obtain video or image data 124 of an entrance area of the property 102. For example, the camera 122 can be a digital camera with video recording capability that is operable to capture video or still images within a viewable area 130 of the property 102.

The monitoring server 160 can be configured to perform various functions for analyzing and monitoring conditions of items and persons in the viewable area 130 at the property 102. For example, the monitoring server 160 can perform these functions based on the video data 124 and other sensor data 125 encoded in wired or wireless signal transmissions received by the monitoring server 160. More specifically, the monitoring server 160 includes a video analytics module 165 that is used to perform the various functions for analyzing and monitoring conditions of items and persons in the viewable area 130.

In some implementations, the analytics module 165 includes, or is configured to access, an example deep-metric learning (DML) system. The DML system can include one or more neural networks, such as artificial neural networks that each include multiple neural network layers. In general, each layer of the neural network is used to process sets of inputs to generate an output for the layer. The inputs can corresponds to images or frames of video data generated using camera 122. Outputs of one or more sets of layers can represent output activations that correspond to activations of neurons in an artificial neural network.

In some implementations, one or more artificial neural networks ("NNs") are configured (pre-trained) to generate sets of features from an input, e.g., an image. For example, an artificial NN can be pre-trained to perform one or more data analysis functions for feature engineering with respect to a portion of input data such as an image or a region of an image. In view of this, the pre-trained NN can have sets of features or feature vectors that are highly-dimensional. Features can be used by the NN to perform various functions relating to, for example, image recognition or object recognition. In some implementations, features are pre-computed, stored, and later accessed for certain types of applications where the target task evolves over time.

Convolutional neural networks (CNNs) have been successful in computer vision and machine learning and have helped push the frontier on a variety of problems. The success of CNNs is attributed to their ability of learning a hierarchy of features ranging from very low-level images features, such as lines and edges, to high-level semantic concepts, such as objects and parts. As a result, pre-trained CNNs can be configured as effective and efficient feature generators. Thus, CNNs can be widely used as a feature-computing module in larger computer vision and machine-learning application pipelines, such as video and image analysis.

In some implementations, the monitoring server 160 can generate alerts and notifications based on the video or image data 124 that is obtained for viewable area 130 and analyzed by the video analytics module 165. Based in part on the image data 124, the monitoring server 160 is operable to: i) perform visual recognition with respect to a type, size, or shape of an item or package 132 within the viewable area 130; ii) perform visual recognition of an individual 133, such as a delivery person; iii) perform identity verification of the individual 133; and iv) generate video logs of detected motion, such as human motion or motion of a robotic delivery vehicle, and detected placement or removal of items within the viewable area 130.

Each of the camera 122 and the monitoring server 160 are configured to track events within the viewable region of interest in area 130 using image frames that are based on video and image data 124 obtained using camera 122. The video and image data 124 can be represented by an input video stream that includes multiple image frames. The input video stream is generated to capture events occurring at the monitored area and that include the region of interest.

The camera 122 is configured to generate an input video stream (e.g., representing a recording stream) based on person-triggered motion detection. For example, the camera 122 can generate an input video stream based on detection of a person within a threshold distance of the property or the entrance area. In some implementations, the camera 122 generates the input video stream based on a proximity sensor, a motion sensor, images frame analysis, or combinations of each. Generating an input video stream can include generating a pre-event image frame and a post-event image frame. This is described in more detail below.

For example, the camera 122 can generate the video stream based on a proximity (or motion) sensor of the camera 122 that is operable to detect when a person is within a threshold proximity of the entrance area or in a field of view of the camera 122. Additionally, or alternatively, the camera 122 can generate the input video stream based on a motion sensor 120 of the property 102 that is operable to detect human motion, including motion of a robotic delivery vehicle, at certain areas of the property 102. The motion sensor 120 is operable to communicate with the camera 122 by transmitting parameter signals to the camera 122 to report detected motion at the entrance area.

In some implementations, the camera 122 can generate the input video stream based on any one of the different types of sensors 120 referenced in the example of FIG. 1. For example, generating the input video stream can be triggered based on sensor data 125, such as audio data or triggering of smart lights, which may indicate an individual 133 is at a particular area or threshold distance of the property 102. In some examples, the input video stream is triggered based on a pre-event image that reveals an individual 133 has entered a field of view of the camera 122 or is within in an area/region of interest that coincides with the field of view of the camera 122.

The camera 122 (or the monitoring server 160) performs image analysis on image frames in the field of view of the camera 122. The image frames can be captured and stored in a memory of the camera 122 (e.g., on-board memory). For example, the image frames can be captured and stored in an image frame buffer of the camera 122. In some examples, the image frame buffer can be configured to store a threshold amount of image frames for a given time period, e.g., 15 seconds, 30 seconds, 45 seconds. An example video/image frame buffer module of the system 100, operable to store image frames for processing and analysis, is described in more detail below with reference to FIG. 2.

As described in more detail below, the video analytics module 165 is represented by sets of modules that cooperate to process image frames of an input video stream generated using the imaging device, e.g., camera 122. To detect delivery or removal of items or packages at the property 102, the system 100 uses the video analytics module 165 to generate pre-event and post-event image frames for an region of interest, such as the entrance area of the property 102. More specifically, the system 100 is configured to trigger image frame processing on pre-event and post-event image frames to detect when an individual 133 is approaching or leaving the entrance of the property 102 to detect whether an item has been delivered or removed.

For example, the system 100 or camera 122 can trigger image frame processing to detect when an individual 133 is approaching the entrance area of property 102 based on a pre-event image (e.g., a pre-event image frame). The pre-event image frame is collected and analyzed in response to detecting that an individual is within a threshold distance of the entrance area. Likewise, the system 100 or camera 122 can trigger image frame processing to detect when an individual 133 is leaving (or has left) the entrance area of property 102 based on a post-event image (e.g., a post-event image frame). The post-event image frame may also be collected and analyzed in response to detecting that an individual is within a threshold distance of the entrance area.

In some implementations, the system 100 is configured to collect or obtain the post-event image frame using an image bounding box 150. For example, the camera 122 is operable to process instructions that cause the camera 122 generate a post-event image frame that includes an image bounding box 150. In some other implementations, the video analytics pipeline 165 applies the image bounding box 150 to items or candidate packages detected in the post-event image frame, for example, in response to processing the post-event image frame relative to the pre-event image frame. The bounding box 150 can be used to define a region of interest that includes an object to be monitored. The image bounding box 150 can be configured as an overlay of an image frame.

The system 100 can perform item or feature recognition on image data 124 to detect candidate items or packages in a pre/post-event image frame obtained from the camera 122. For example, the video analytics pipeline 165 can perform this detecting by processing or analysing the image frames using machine-learning (ML). In some implementations, the video analytics pipeline 165 uses an ML data model that implements one or more machine-learning algorithms, e.g., deep-learning algorithms, to perform item/feature recognition on contents of an image frame based on image pixel values of the frame.

In general, features associated with an image can represent attributes shared by independent units, such as groups of image pixels forming objects (or items) in an image, on which analysis or prediction is to be performed. In some cases the features are attributes of an object depicted in an image, such as a line or edge defined by a group of image pixels. Representations for an image can include global and local features. In this context of image processing, a global feature, also commonly referred to as a "global descriptor," summarizes the contents of an image abstractly.

Global descriptors/features can be obtained from convolutional computations associated with deep layers in a convolutional neural network (CNN). The global descriptors often involve processing abstract information about the content of the image. In some cases, object identifiers such as geometry and spatial location information are not detectable from this abstract information. In contrast to global features, local features can involve descriptors and geometry information about specific image regions. In some implementations, local features are especially useful to match or perform recognition tasks on images depicting rigid objects, such as box or package delivered to a property.

As described in more detail below, the analytics module 165 can generate a score that provides as a measure for a binary classification of "region changed," indicating a package has been removed, versus "region not changed," indicating a package is still there. The score can be computed based on interest points and image features determined from image pixel values between various images and frames obtained from the imaging device 122. A computed score is compared to a threshold score (170) to determine the binary classification that indicates whether a prior object is present or absent within a region. The threshold score can be a predefined score that represents the extent of change between obtained images of a region over time.

The monitoring server 160 is configured to generate an alert or notification 175 that indicates detection, or removal, of a package 132. A user 108 can use a mobile/client device 140 to interact with a smart home application to receive the alerts 175 and provide commands to the camera 122 and monitoring server 160, e.g., via the control unit, to perform one or more operations described in this document. The user 108 can be a property/homeowner, security manager, property manager, or occupant/resident of the property 102. The user 108 can communicate with the camera 122, the monitoring server 160, or control unit, through a software application (e.g., "smart home" or "smart business" application) installed on mobile device 140.

Figure 2:
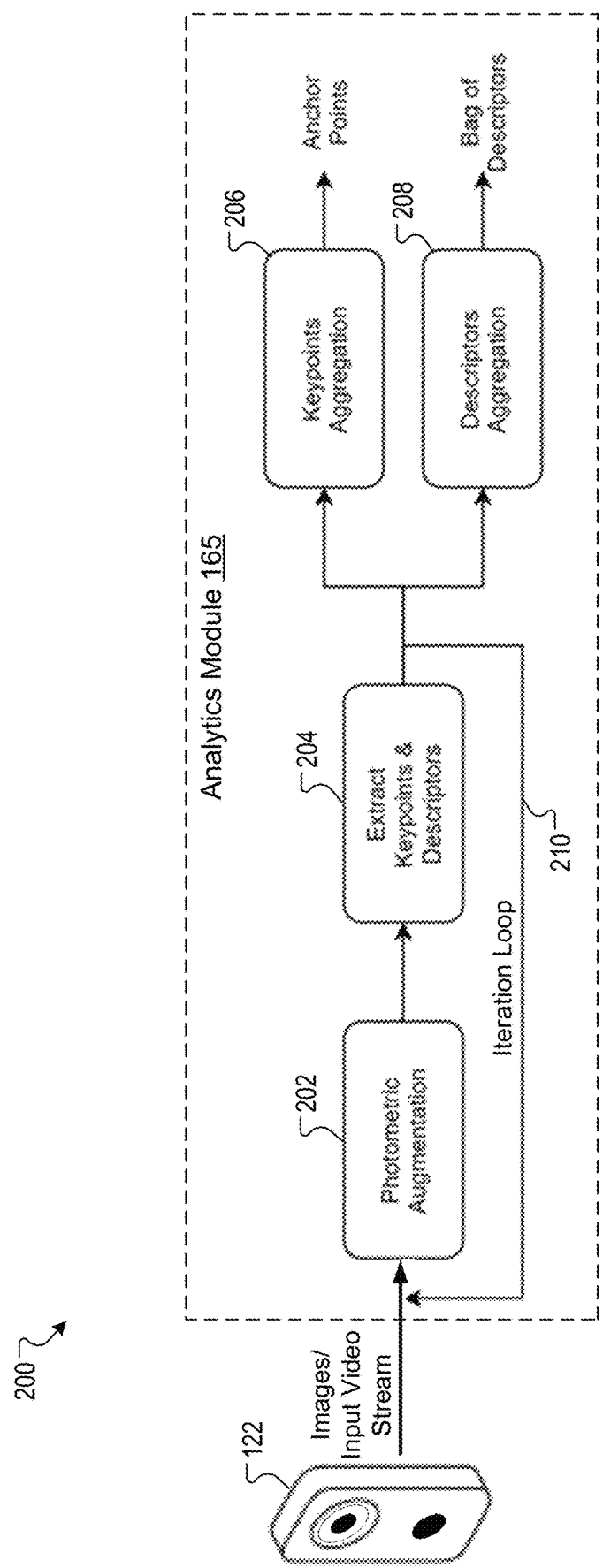
FIG. 2 shows a block diagram of an example analytics system for computing data values used to monitor presence or absence of an item at a property.

FIG. 2 shows a block diagram of an example analytics system 200 for computing data values used to monitor presence and/or absence of an item at a property. The system 200 generally includes the imaging device 122 and analytics module 165 described earlier with reference to FIG. 1. In some cases, system 200 may be included as a sub-system of system 100. For example, the system 200 may be included as a sub-system of hardware circuits (e.g., special-purpose circuitry) that includes two or more processor microchips. In general, each of systems 100 and 200 can include processors, such as a central processing unit (CPU) or graphics processing unit (GPU), memory, and data storage devices that collectively form computer systems of these systems.

Referring again to FIG. 2, the analytics module 165 performs local region matching at least by applying photometric augmentation (202) and extracting keypoints corresponding to computed interest points and their associated descriptors (204). In some implementations, the keypoints represent interest points that are repeated among one or more images after each iteration of applying photometric augmentation to a given image. This is described in more detail below.

In general, when a region in an image has a distinguishable appearance with non-repeating texture, relating to packages with labels on them, interest points (e.g., local interest points) and their descriptors provide a reliable way to represent the region. For each representation or image, the analytics module 165 is configured to build a map of interest points, where each interest point has a corresponding probability that indicates an importance of that interest point. A measure of importance or relevance of an interest point can be based on a likelihood that the interest point indicates a particular item or object, or a particularly type of object. For example, a measure of importance or relevance of an interest point can be a likelihood that the interest point indicates an item that may be delivered to a property or an area around where an object may be place. The object can be a package or attribute of a package, such as a label, an enclosure, an edge, a periphery, or a marking. The analytics module 165 can generate a representation of a region in an image and process image pixel values of that region to determine whether an object or delivered item (e.g., package) is there or not.

Using such local, digital representations, the analytics module 165 is configured to implement region matching by matching local descriptors between regions and across two more images. The analytics module 165 defines interest points as well-defined positions on the region that are stable under local and global perturbations in the image domain as illumination/brightness variations and are repeatable. Extracting such stable and repeatable interest points can provide a required indicator for detecting object absence or presence. The requirement for repeatability of interest points may be especially true when region matching is performed over time.

The analytics module 165 iteratively computes interest points for an object in a region of an image/frame in response to applying photometric augmentation to the image. For example, for each image or image frame received by the analytics module 165, the module can apply a photometric augmentation to the image to modify/augment attributes of the image prior to computing interest points for the augmented image. In some implementations, the photometric augmentation is applied iteratively to each image as a precursor to computing interest points for the object in the region. As discussed below, iteratively computing interest points for the object based on photometric augmentation can include, for each image of the multiple images, performing a Scale Invariant Feature Transform (SIFT) operation on the image to obtain an interest point in the image.

For example, during a first iteration of processing a first image, the analytics module 165 applies photometric augmentation to augment illumination, brightness, contrast, or combination of these attributes of the first image. During this first iteration, following application of the photometric augmentation, the analytics module 165 then computes interest points for the augmented first image. During a second, different iteration of processing the first image, the analytics module 165 applies photometric augmentation to augment (e.g., further augment) illumination, brightness, contrast, or combination of these attributes of the first image. During this second iteration, following application of this further photometric augmentation, the analytics module 165 then computes interest points for the further augmented first image.

As noted above, in some implementations, the analytics module 165 applies photometric augmentation by performing a Scale Invariant Feature Transform (SIFT) operation on the image. In general, a SIFT algorithm can provide a reliable and robust technique for feature extraction due to its invariance to scale, rotation, illumination, viewpoint, and translations of image or other input data items. In some implementations, for a given image or set of images, the SIFT algorithm is operable to return interest points with one or more descriptors for each interest point.

For example, the SIFT algorithm can be used to generate multiple (e.g., 8) representations for a single image, where some (or all) of the representations can each indicate a given {x, y} coordinate as an interest point. The SIFT algorithm can also return a response value that represents a probability of the strength of that interest point for indicating a particular type of object or attribute of that object. In some examples, the SIFT algorithm is implemented using a Gaussian model and a particular interest point may be a center of the Gaussian analysis.

Performing the SIFT operation on the image can include augmenting multiple attributes of the image, including augmenting attributes of the object and one or more items depicted in the image. The analytics module 165 can then obtain interest points in an image in response to performing the SIFT operation on the image. For example, the analytics module 165 can implement a SIFT algorithm to detect, describe, and/or match local features in a single image or across multiple images. The SIFT algorithm can be used to perform these functions in response to identifying, extracting, and processing certain keypoints in an image.

In some implementations, iteratively computing interest points for the object based on photometric augmentation includes: generating multiple representations of the image based on the augmenting of the multiple attributes of the image; and identifying a subset of features (e.g., corresponding to interest points) of the image that are repeated across the multiple representations irrespective of the augmentation performed on the image.

For example, using the SIFT algorithm, the analytics module can recognize an object in a new image by individually comparing each feature from the new image to a preexisting subset of features or keypoints (e.g., interest points) derived from one or more of the previous images. From this comparison, the analytics module 164 can detect, or otherwise locate, candidate matching features across multiple images. For example, using the SIFT algorithm, the analytics module 164 can detect candidate matching features based on a Euclidean distance of respective points or feature vectors derived for each of the new image and the one or more prior images.

The analytics module 165 augments the attributes of the images to account for appearance changes of items depicted in an image of a region. For example, changes in the appearance of items in an image may occur based on external conditions such as changes in an amount of artificial or natural light (sunlight) present at a monitored area. In some implementations, this processing of iteratively augmenting an image and then computing interest points can occur sequentially or concurrently for multiple images. For example, the analytics module 165 can augment photometric attributes and compute interest points for multiple images in parallel.

The analytics module 165 aggregates stable and repeatable interest points (e.g., keypoints) and uses these keypoints to perform anchor point estimation (206). For example, to determine a set of anchor points the analytics module 165 can determine a respective set of descriptors for a particular interest point. In some instances, this particular interest point can be a candidate or potential anchor point that will ultimately be included among a set of estimated anchor points. Each respective set of descriptors represents a local region around a particular interest point from which a corresponding anchor point is to be determined.

For each image/region, the interest points are computed and extracted for multiple images of the region over time. Additionally, the interest points are computed and extracted for multiple images of the region over time as well as for multiple iterative photometric augmentations of the image. For example, the iterative photometric augmentations can include the image being subjected to various illumination augmentations such as random change in the brightness or contrast of the image or adding local shade to different features of the image.

The analytics module 165 generates a digital representation of the region and the object based on interest points that are repeated across the images after each application of the photometric augmentation. For example, to generate the representation, the analytics module 165 can identify a set of interest points. For some or all of the identified interest points, the analytics module 165 extracts those interest points and performs one or more operations to fuse the interest points over the images. In addition to extracting the interest points, the analytics module 165 can also aggregate the respective probability/response values for each of the extracted interest points. For example, the analytics module 165 can fuse the interest points across a set of the images at least by concatenating respective numerical vectors for each interest point across the set of the images.

In some implementations, the analytics module 165 runs or executes an example detection algorithm to detect and extract a respective interest point from each input image. An example detection algorithm can be the SIFT algorithm (described earlier), a RootSIFT algorithm, or another related detection algorithms. In general, a RootSIFT algorithm can be used to obtain an enhanced SIFT descriptor(s). The analytics module 165 can also use a combination of approaches or algorithms to detect and extract interest points.

In some implementations, the analytics module 165 performs an example fusion process to fuse interest points across a set of images. For example, the fusion process can include identifying a respective set of extracted interest points from multiple images, pooling the respective set of extracted interested points, and selecting a final set of interest points from among the pooled set. The analytics module 165 can select the final set at least by applying a threshold value such that the system selects interest points that have certain confidence, probability (or response) values that exceed a pre-defined threshold. For example, during the fusion process, the analytics module 165 can identify or determine a respective response value for each interest point as well as a repeatability metric for the interest point.

The analytics module 165 can then use the respective interest point response values and the corresponding repeatability of interest points to compute a confidence score for each interest point. Confidence scores (e.g., numerical scores) that exceed a particular threshold score (e.g., 0.77) can indicate interest points with high repeatability or high response values. These high confidence scores can be used as a bias for selection to the final set. In some implementations, obtaining a final set of interest points includes performing a sort on the computed confidence scores and discarding the interest points with score (or response values) below a certain threshold. Based on these operations, the analytics module 165 is able to identify, pool, and/or select final interest points that yield high confidence scores as outputs of the fusion process.

The analytics module 165 can perform the interest point detection and extraction operations to determine (or estimate) anchor points from the interest points that repeat across multiple images as well as to generate representation subspaces for a region depicted across the multiple images. In some implementations, for a given image region such as a respective portion of multiple images that each include a package box with an affixed label, the analytics module 165: i) computes a respective probability value for each of the interest points that repeat across the multiple images and ii) aggregates interest points that have a respective probability value that exceeds a threshold probability value.

The analytics module 165 can determine or estimate the set of anchor points based on the aggregated interest points. The aggregation process takes the response values as well as the repeatability of interest points into consideration such that the points with high repeatability or high probability receive a high score after fusion. The analytics module 165 generates a final set of interest points by sorting the computed scores and discarding the points with response values below a certain threshold. The final set of interest points extracted for the region of interest are identified as the anchor points. The analytics module 165 can also generate representation subspace for that region based on the anchor points corresponding to the aggregated interest points.

Bag of Descriptors

The analytics module 165 is configured to aggregate the anchor points over time and over photometric augmentations of the region. Concurrent with aggregating the anchor points, the analytics module 165 obtains and aggregates various descriptors for each anchor point across the various images that are processed (208). The descriptors represent the local region around each interest point across the various images that have been augmented to have, for example, different illumination, brightness, contrast, and shadow. In some implementations, a local region is a numerical representation corresponding to a grouping of pixels or pixel values. For example, local region can be represented as a numerical vector or matrix, such as 128×128.

To have a robust representation for each anchor point, the analytics module 165 is configured to store all (or some) of the descriptors for each interest point and compute a final, robust representation for the final anchor points by constructing a bag of descriptors for each of them. For example, the analytics module 165 can determine a first bag of descriptors representing a first local region around a first anchor point for a first image of the area. This first image can include an object corresponding to a package having a label. The analytics module 165 can also determine a second bag of descriptors representing a second local region around a second anchor point. In some examples, the second bag of descriptors representing a second local region can be for the first image or for a second, different image of the same area at the property.

The bag of descriptors can be processed to address any changes or variations in appearance of a region due to external conditions such as a change in the lighting or brightness of an area that includes a package being imaged. Depending on the number of descriptors the system 100 computes per anchor point, which is related to repeatability of each anchor point, the analytics module 165 can use a machine-learning approach such as principle component analysis (PCA), dictionary learning, or clustering to generate a final representation subspace for each anchor point.

Following initial detection of an object at an area of the property, system 100 is operable to detect the absence, or continued presence, of the object based at least on a combination of photometric augmentation and iterative processing of images generated by camera 122. Results of these combined processes can be used to determine whether detected object (e.g., a delivered package) is still present at a particular location or has been removed from that location. In some instances, the removal of the object may be indicative of theft.

Referring again to the above example, steps in executing the combined processes can include the system 100 generating: i) a first representation subspace for the first anchor point based on the first bag of descriptors and ii) a second representation subspace for the second anchor point based on the second bag of descriptors. As described below, the system 100 can use the analytics module 165 to perform feature matching across the first representation subspace and the second representation subspace. For example, the analytics module 165 can compute a distance value that characterizes a detected feature match between corresponding descriptors of the first representation subspace and the second representation subspace. The system 100 can detect the absence or continued presence of the object at the property based on the computed distance value.

Region Matching Verification

Whenever a human-related activity is detected, e.g., triggering a pre-event image, in the region of interest, an image of the region is captured after the activity is finished (e.g., post-event image). At least the post-event image is sent to the analytics module 165 and used as data inputs to an example object verification algorithm to verify if the region has changed or not. Using the anchor points computed for the region, the local descriptors are extracted for the local regions around each anchor point on at least this image. The computed local descriptors are then matched against the bag of descriptors.

The analytics module 165 performs feature matching. For example, the analytics module 165 can perform the feature matching using a brute force algorithm with a ratio test. In some implementations, the analytics module 165 performs the feature matching based on machine-learning approach that process multiple test descriptors. For each test descriptor, the analytics module 165 can determine k=2 best matches in the representation set. These matches can represent anchor descriptors. Other values for k may be used based on design preference. The analytics module 165 can characterize each match by a distance value between the corresponding descriptors. A ratio between the distances of the two top matches is then computed and the analytics module 165 applies a threshold comparator operation with respect to the ratio. For example, if the ratio is below a threshold, e.g. 0.7, the top match is added to the pool of valid matches, otherwise both matches are discarded.

The analytics module 165 can use an iteration loop 210 to compute the interest points and to implement the iterative photometric adaptation approach described above. In some implementations, the analytics module 165 includes a machine-learning engine that implements one or more deep-learning algorithms and uses the iteration loop 210 to train a machine-learning model to improve upon the stability and repeatability of the interest points as well as the model's ability to detect stable and repeatable interest points.

Figure 3:
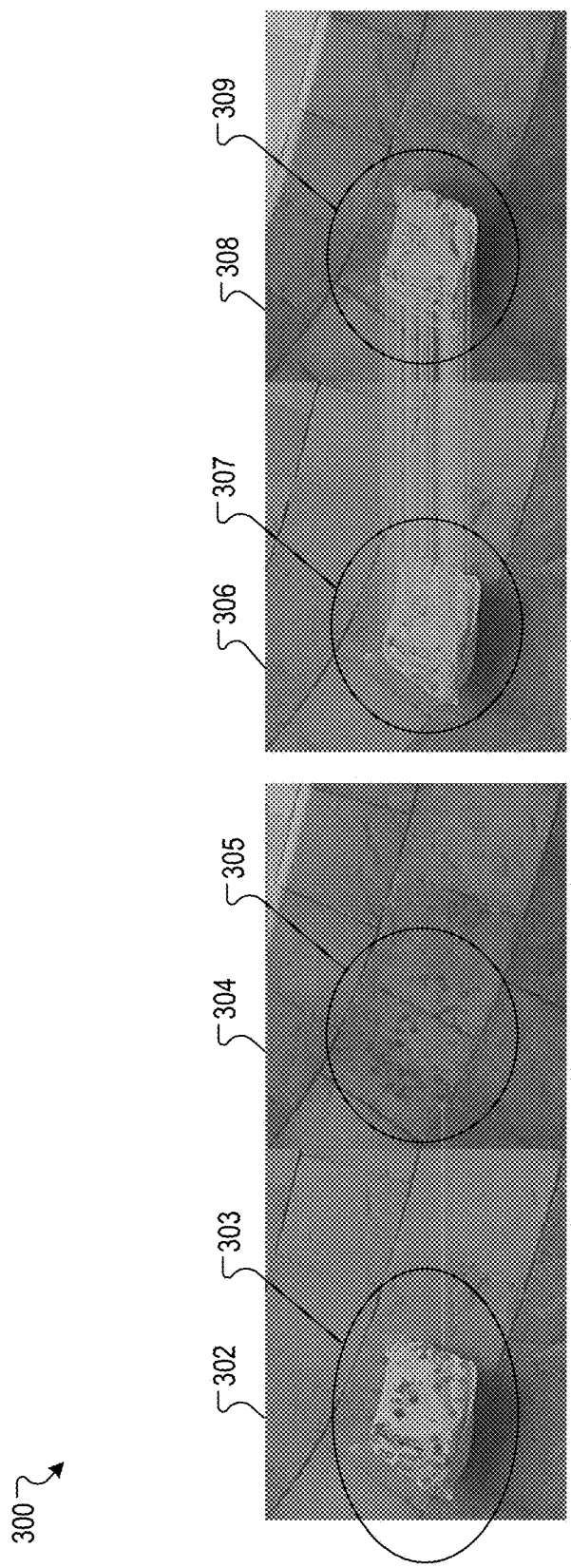
FIG. 3 illustrates example images that indicate anchor points used for local region matching to monitor presence or absence of an item at a property.

FIG. 3 illustrates example representations 300 that indicate anchor points used for local region matching to monitor presence and/or absence of an item at a property. The example of FIG. 3 includes images 302, 304, 306, and 308. Image 302 depicts a first instance of an area or region 303 at a property that includes an object, such as a package, whereas image 304 depicts a second, different instance of the region 305 where the object is absent or has been removed. As explained below, the difference between regions 303, 305 depicted images 302, 304 respectfully, means that the region has changed, for example because the package has been picked up.

Each of image 306, 308 depicts an area or region 307 at a property that includes an example of a package. Each of image 306, 308 includes annotations shown in red and green that indicate matching or consistent interest points and/or anchor points. For example, these interest points and/or anchor points may be repeated over multiple representations of different images to give a reliable indication that the detected object is still present within the region at the property. In in the example of FIG. 3, the system 100 generates digital representations 300 of one or more regions and an object associated with the region(s) based on interest points that repeat across multiple images of the region after each respective application of photometric augmentation. The system 100 can also determine, based on the digital representations 300, a set of anchor points (e.g., red points) from the interest points that repeat across the images.

The analytics module 165 is configured to quantify a match between the descriptors of a test region, such as regions 303, 305, or 307, and the bag of descriptors using an average precision score, AP-score. The AP-score provides as a measure for a binary classification of "region changed" (e.g., package has been removed, as shown at region 305) versus "region not changed" (e.g., package is still there, as shown at region 307). The analytics module 165 determines whether or not corresponding descriptors indicate a match for a given region being monitored. For example, if the monitored object of a region 307 is still in the region 307, indicating that the region 307 has not changed, then some (or all) of the corresponding descriptors will demonstrate a match with each other.

These descriptors represent the descriptors extracted from the same location across in two or more images or in an image pair, such as images 306, 308. In some implementations, these descriptors provide ground-truth labels for the AP-score computation. In some other implementations, local changes might happen in an image which are not represented in a bag of descriptors. In this instance, some of the corresponding descriptors do not match. When this occurs, these unmatched descriptors may be counted toward false negative cases.

The analytics module 165 is configured to compute the precision and recall values for the matching results. Let $y=(y_1, \ldots, y_n) \in \{-1, 1\}^n$ be ground-truth labels for the matching descriptor pairs, where 1 means the descriptors are extracted from the same location in the image pair and −1 means otherwise. The precision and recall at rank i are given by:

$$P_i(y)=\Sigma_{k=1}^{i}[y_k]_+/\Sigma_{k=1}^{i}|y_k| \qquad (1)$$

$$R_i(y)=\Sigma_{k=1}^{i}[y_k]_+/\Sigma_{k=1}^{N}[y_k]_+ \qquad (2)$$

where $[z]_+=\max\{0, z\}$, where corresponds maximum value. The AP score is then computed using the area under the precision-recall curve as:

$$AP(y)=\Sigma_{k:y_k=+1}P_k(y)/\Sigma_{k=1}^{N}[y_k]_+ \qquad (3)$$

where the precision-recall curve relates to a standard operation for evaluating the effectiveness or accuracy of an algorithm, for example, based on the number of time use of the algorithm yields an accurate output.

The analytics module 165 is configured to compute or obtain a final decision. For example, the final decision is obtained by thresholding a computed AP-score. An AP-score below a threshold, e.g., 0.6, verifies a change in the region which translates to the removal of the package, whereas if an AP-score is above the selected threshold, the region has not changed. If the analytics module 165 determines that the region has not changed, the monitoring server 160 may interact with the analytics module 165 to indicate to a user 108 that the object of interest is still presented in the region. In the example of FIG. 3, images 306, 308 show examples of matching results and for a given AP-score.

Figure 4:
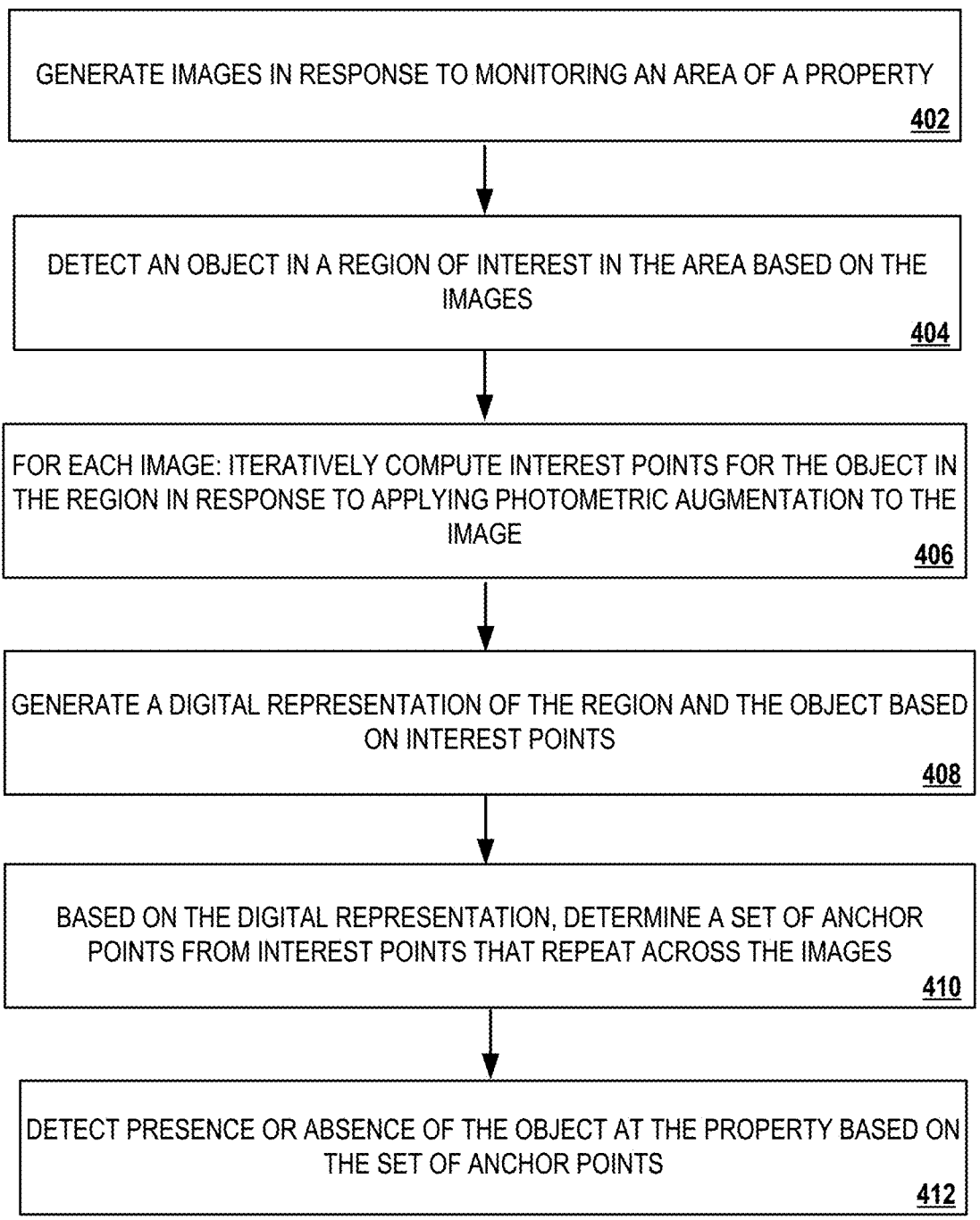
FIG. 4 shows an example process for monitoring presence or absence of an item at a property.

FIG. 4 shows an example process 400 for performing object monitoring to detect presence or absence of the object. Process 400 can be implemented or executed using the system 100 described above. Descriptions of process 400 may reference the above-mentioned computing resources of system 100, including the system 200 and its components and resources. For example, the process 400 may be performed using a doorbell camera or another sensing device capable of detecting and capturing imagery of an object at the property 102. Steps or actions of process 400 can be performed based on programmed firmware or software instructions, which are executable by one or more processors of the devices and resources described in this document.

Referring now to process 400, the system 100 generate images in response to monitoring an area of a property (402). For example, the camera 122 can generate an input video stream of an area of a property. The camera 122 can generate an input video stream that coincides with detection of an individual 133 within a threshold distance of the entrance area, or other monitored area, of property 102. In some implementations, process 400 represents a computer-implemented method that uses a video analytics pipeline and a doorbell camera, such as camera 122, to monitor items and packages delivered to a property.

The system 100 detects an object in a region of interest in the area based on the images (404). In some implementations, to initiate package monitoring, the system 100 identifies a region of interest that represents an area where packages are placed when delivered to the property 102. For example, the region of interest can be defined automatically by the monitoring server 160 or manually by the user 108. In some implementations, the user 108 interacts with a graphical interface of a smart home application to define the region of interest. The region of interest can be defined within, or relative to, a field of view (FOV) of the doorbell camera 122. The system 100 can perform image processing to detect an object in a region of interest. For example, the system 100 can perform the processing to detect the object in the region based on areas or items depicted in representative images of the area being monitored at the property 102.

For each image, the system 100 iteratively computes interest points for the object in the region in response to applying photometric augmentation to the image (406). For example, the system 100 applies the photometric augmentation to the image, e.g., each image, prior to each iteration of computing the interest points. To compute interest points, the analytics module 165 can process individual images or process each image frame in a sequence of frames that form the input video stream. The frames may include the pre-event and post-event image frames described above.

In some implementations, the video analytics module 165 processes each of pre-event and post-event image frames using a ML model that implements a deep-learning algorithm. The deep-learning algorithm is used to train the ML model for detection of object presence or absence based on multiple types of images, including multiple different color images. Based on the processing, the analytics module 165 can compute a respective set of interest points for each of the multiple image frames of the input video stream.

The system 100 generates a digital representation of the region and the object based on different set of interest points (408). For example, the analytics module 165 generates the digital representation based on the interest points that are repeated across the images after each application of the photometric augmentation. Based on the digital representation, the system 100 uses the analytics module 165 to determine a set of anchor points from the interest points that are repeated across the images (410). The analytics module 165 can use a machine-learning approach such as principle component analysis (PCA), dictionary learning, or clustering to generate a final representation subspace for each anchor point.

As described above, an operation or output of the fusion process can include selection of a final set of strong interest points, such as interest points with high response values that are indicative of a particular attribute or feature of a package delivered to a property. Each interest point includes a set of descriptors that depict an appearance of the interest point. For example, the descriptors can depict the appearance of the interest point in various images with respect to different illumination, brightness, contrast, and shadow.

The system 100 can apply a machine-learning algorithm to the descriptors for each of the interest points to process the descriptors. For example, the analytics module 165 can use the machine-learning algorithm to process data values for a respective set of descriptors for each interest point to generate or otherwise obtain a compact representation of a corresponding descriptor subpsace. The analytics module 165 obtains a compact representation at least by removing redundancy in the descriptors.

The system 100 can use one or more pre-trained machine-learning models (e.g., a classification model) to learn image representations for filtering or removing redundant descriptors. In some implementations, the filtering is performed by removing the most similar images, where similarity is determined based on an L2 distance between image representations in Euclidean distance. For context, as used in this document Euclidean distance is the shortest distance between two points in an N dimensional space also known as Euclidean space. Euclidean distance can be used as a metric to measure the similarity between two data points of an image.

For example, using PCA, a mean vector is first computed using the descriptors of an interest point. Using the PCA approach, the analytics module 165 can construct a low-dimensional space based on difference vectors between the descriptors and the computed mean vectors. Based on this approach, a descriptor subspace that initially represented a large number of descriptors for interest points can be compactly represented by a mean vector and one or more principal components.

Likewise, the system 100 can also apply clustering to the descriptors of interest points such that only the cluster centers are required to represent a descriptor subspace of an interest point. In some implementations, to obtain a more flexible and accurate representation of the descriptor subspace, the analytics module 165 can combine the two approaches (e.g., PCA & clustering) such that clustering is first applied and then PCA is applied to the descriptors in each cluster.

The system 100 detects presence or absence of the object at the property 102 based on the set of anchor points (412). For example, the system 100 computes a respective AP-score for each anchor point with respect to placement of a candidate item at the property 102. The analytics module 165 detects presence or absence by applying a threshold score to each computed AP-score.

The analytics module 165 performs local region matching by determining whether AP-scores for anchor points in a first image exceed the threshold score relative to whether AP-scores for anchor points in a second, image exceed the threshold score. If scores for corresponding anchor points in each of the first and second images exceed the threshold (e.g., 0.6), then the analytics module 165 determines that the object is still presence at the monitored area. If scores for corresponding anchor points in the second image fall below the threshold (e.g., 0.6), then the analytics module 165 determines that the object is absent from the monitored area.

Figure 5:
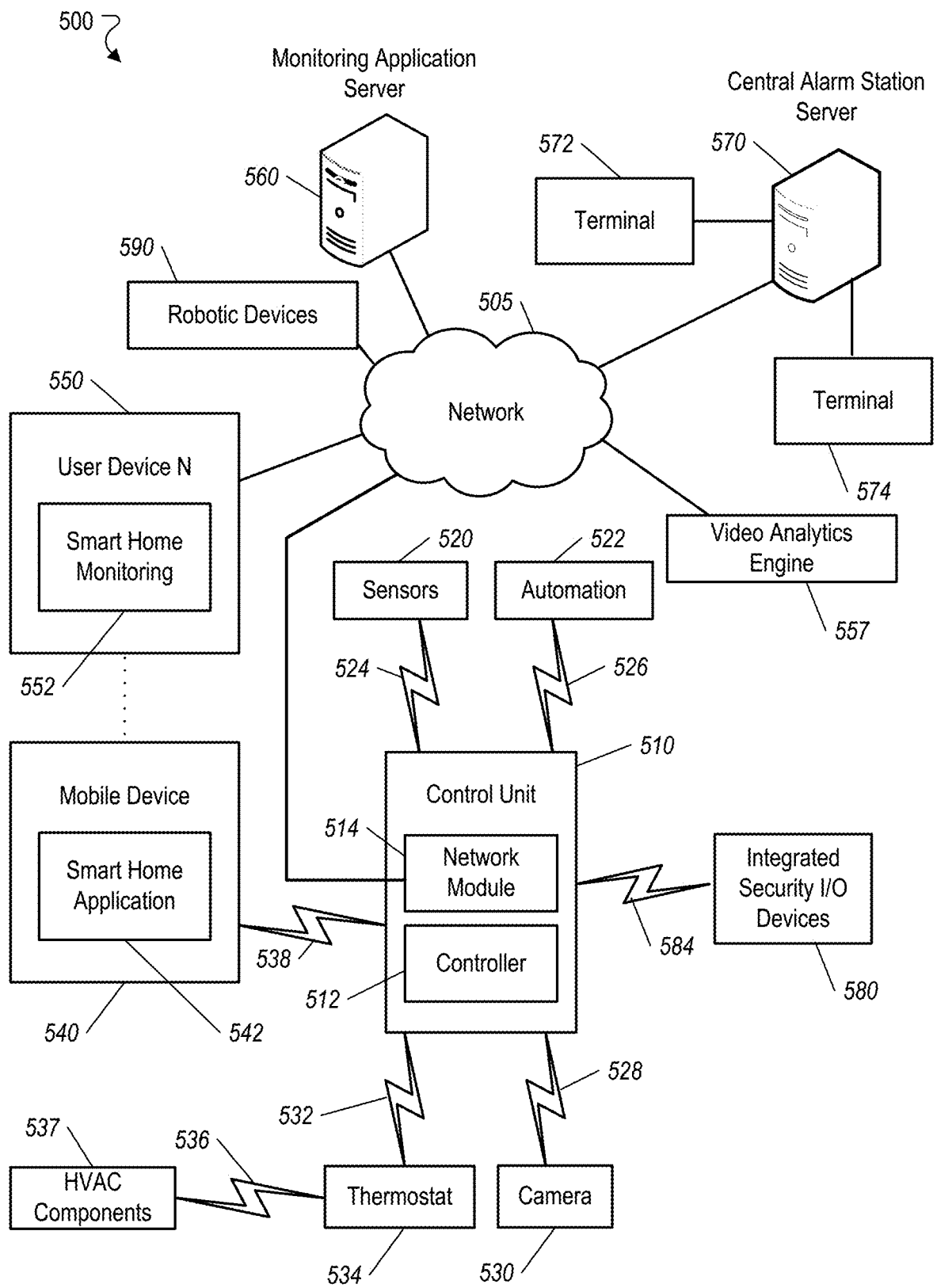
FIG. 5 shows a diagram illustrating an example property monitoring system.

FIG. 5 is a diagram illustrating an example of a property monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system.

In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. Also, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information 556 and the state of the HVAC system components to the thermostat 534 and can control the one or more components of the HVAC system based on commands received from the thermostat 534.

The system 500 includes one or more video analytics engines 557. Each of the one or more video analytics engines 557 connects to control unit 510, e.g., through network 505. The video analytics engines 557 can be computing devices (e.g., a computer, microcontroller, FPGA, ASIC, or other device capable of electronic computation) capable of receiving data related to the sensors 520 and communicating electronically with the monitoring system control unit 510 and monitoring server 560.

The video analytics engine 557 receives data from the camera 122 and one or more sensors 520. In some examples, the video analytics engine 557 can be used to determine or indicate whether a package is delivered to the property based on data generated by the camera 122, including data from sensors 520 (e.g., data from sensor 520 describing motion, movement, temperatures and other parameters). The video analytics engine 557 also determines or indicates whether an object or package that was previously detected or delivered to the property is still present at an initial location or is absent from that location.

The video analytics engine 557 performs these determinations based on data generated by the camera 122, including data from sensors 520 (e.g., data from sensor 520 describing motion, movement, temperatures and other parameters). The video analytics engine 557 can receive data from the camera 122 and the one or more sensors 520 through any combination of wired and/or wireless data links. For example, the video analytics engine 557 can receive sensor data via a Bluetooth, Bluetooth LE, Z-wave, or Zigbee data link.

The video analytics engine 557 communicates electronically with the control unit 510. For example, the video analytics engine 557 can send data related to the image frames and the sensors 520 to the control unit 510 and receive commands related to item delivery at the property based on processing of the image frames and data from the sensors 520. In some examples, the video analytics engine 557 processes or generates sensor signal data, for signals emitted by the sensors 520, prior to sending it to the control unit 510. The sensor signal data can include information that indicates an operating mode of the camera 122, as well as image or video data generated by the camera 122.

In some examples, the system 500 further includes one or more robotic devices 590. The robotic devices 590 may be any type of robots that are capable of moving and taking actions that assist in home monitoring. For example, the robotic devices 590 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 590 may be devices that are intended for other purposes and merely associated with the system 500 for use in appropriate circumstances. For instance, a robotic vacuum cleaner device may be associated with the monitoring system 500 as one of the robotic devices 590 and may be controlled to take action responsive to monitoring system events.

In some examples, the robotic devices 590 automatically navigate within a home. In these examples, the robotic devices 590 include sensors and control processors that guide movement of the robotic devices 590 within the home. For instance, the robotic devices 590 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 590 may include control processors that process output from the various sensors and control the robotic devices 590 to move along a path that reaches the desired destination and avoids obstacles. In this regard, the control processors detect walls or other obstacles in the home and guide movement of the robotic devices 590 in a manner that avoids the walls and other obstacles.

In addition, the robotic devices 590 may store data that describes attributes of the home. For instance, the robotic devices 590 may store a floorplan and/or a three-dimensional model of the home that enables the robotic devices 590 to navigate the home. During initial configuration, the robotic devices 590 may receive the data describing attributes of the home, determine a frame of reference to the data (e.g., a home or reference location in the home), and navigate the home based on the frame of reference and the data describing attributes of the home. Further, initial configuration of the robotic devices 590 also may include learning of one or more navigation patterns in which a user provides input to control the robotic devices 590 to perform a specific navigation action (e.g., fly to an upstairs bedroom and spin around while capturing video and then return to a home charging base). In this regard, the robotic devices 590 may learn and store the navigation patterns such that the robotic devices 590 may automatically repeat the specific navigation actions upon a later request.

In some examples, the robotic devices 590 may include data capture and recording devices. In these examples, the robotic devices 590 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 590 to take and store a biometric sample that can be used to identify the person (e.g., a biometric sample with DNA that can be used for DNA testing).

In some implementations, the robotic devices 590 may include output devices. In these implementations, the robotic devices 590 may include one or more displays, one or more speakers, and/or any type of output devices that allow the robotic devices 590 to communicate information to a nearby user.

The robotic devices 590 also may include a communication module that enables the robotic devices 590 to communicate with the control unit 510, each other, and/or other devices. The communication module may be a wireless communication module that allows the robotic devices 590 to communicate wirelessly. For instance, the communication module may be a Wi-Fi module that enables the robotic devices 590 to communicate over a local wireless network at the home. The communication module further may be a 900 MHz wireless communication module that enables the robotic devices 590 to communicate directly with the control unit 510. Other types of short-range wireless communication protocols, such as Bluetooth, Bluetooth LE, Z-wave, Zigbee, etc., may be used to allow the robotic devices 590 to communicate with other devices in the home. In some implementations, the robotic devices 590 may communicate with each other or with other devices of the system 500 through the network 505.

The robotic devices 590 further may include processor and storage capabilities. The robotic devices 590 may include any suitable processing devices that enable the robotic devices 590 to operate applications and perform the actions described throughout this disclosure. In addition, the robotic devices 590 may include solid state electronic storage that enables the robotic devices 590 to store applications, configuration data, collected sensor data, and/or any other type of information available to the robotic devices 590.

The robotic devices 590 are associated with one or more charging stations. The charging stations may be located at predefined home base or reference locations in the home. The robotic devices 590 may be configured to navigate to the charging stations after completion of tasks needed to be performed for the monitoring system 500. For instance, after completion of a monitoring operation or upon instruction by the control unit 510, the robotic devices 590 may be configured to automatically fly to and land on one of the charging stations. In this regard, the robotic devices 590 may automatically maintain a fully charged battery in a state in which the robotic devices 590 are ready for use by the monitoring system 500.

The charging stations may be contact based charging stations and/or wireless charging stations. For contact based charging stations, the robotic devices 590 may have readily accessible points of contact that the robotic devices 590 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 590 may charge through a wireless exchange of power. In these cases, the robotic devices 590 need only locate themselves closely enough to the wireless charging stations for the wireless exchange of power to occur. In this regard, the positioning needed to land at a predefined home base or reference location in the home may be less precise than with a contact based charging station. Based on the robotic devices 590 landing at a wireless charging station, the wireless charging station outputs a wireless signal that the robotic devices 590 receive and convert to a power signal that charges a battery maintained on the robotic devices 590.

In some implementations, each of the robotic devices 590 has a corresponding and assigned charging station such that the number of robotic devices 590 equals the number of charging stations. In these implementations, the robotic devices 590 always navigate to the specific charging station assigned to that robotic device. For instance, a first robotic device may always use a first charging station and a second robotic device may always use a second charging station.

In some examples, the robotic devices 590 may share charging stations. For instance, the robotic devices 590 may use one or more community charging stations that are capable of charging multiple robotic devices 590. The community charging station may be configured to charge multiple robotic devices 590 in parallel. The community charging station may be configured to charge multiple robotic devices 590 in serial such that the multiple robotic devices 590 take turns charging and, when fully charged, return to a predefined home base or reference location in the home that is not associated with a charger. The number of community charging stations may be less than the number of robotic devices 590.

Also, the charging stations may not be assigned to specific robotic devices 590 and may be capable of charging any of the robotic devices 590. In this regard, the robotic devices 590 may use any suitable, unoccupied charging station when not in use. For instance, when one of the robotic devices 590 has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, 536, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CATS) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 6 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 6 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, the robotic devices 590, and the video analytics engine 557. The one or more user devices 540 and 550 receive data directly from the camera 122, sensors 520, the home automation controls 522, the camera 530, the robotic devices 590, and the video analytics engine 557 and sends data directly to the camera 122, sensors 520, the home automation controls 522, the camera 530, the robotic devices 590, and the video analytics engine 557. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, the robotic devices 590, and the video analytics engine 557 are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, the robotic devices 590, and the video analytics engine 557 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, the robotic devices 590, and the video analytics engine 557 to a pathway over network 505 when the one or more user devices 540 and 550 are farther from the sensors 520, the home automation controls 522, the camera 530, the thermostat 534, the robotic devices 590, and the safety engine.

In some examples, the system leverages GPS information from the one or more user devices 540 and 550 to determine whether the one or more user devices 540 and 550 are close enough to the sensors 520, the home automation controls 522, the camera 530, the thermostat 534, the robotic devices 590, and the video analytics engine 557 to use the direct local pathway or whether the one or more user devices 540 and 550 are far enough from the sensors 520, the home automation controls 522, the camera 530, the thermostat 534, the robotic devices 590, and the video analytics engine 557 that the pathway over network 505 is required.

In other examples, the system leverages status communications (e.g., pinging) between the one or more user devices 540 and 550 and the sensors 520, the home automation controls 522, the camera 530, the thermostat 534, the robotic devices 590, and the video analytics engine 557 to determine whether communication using the direct local pathway is possible. If communication using the direct local pathway is possible, the one or more user devices 540 and 550 communicate with the sensors 520, the home automation controls 522, the camera 530, the thermostat 534, the robotic devices 590, and the video analytics engine 557 using the direct local pathway. If communication using the direct local pathway is not possible, the one or more user devices 540 and 550 communicate with the sensors 520, the home automation controls 522, the camera 530, the thermostat 534, the robotic devices 590, and the video analytics engine 557 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method, comprising:
maintaining a plurality of images that were generated while monitoring an area of a property;
detecting, using at least some of the plurality of images, an object in a region of interest in the area;
for at least some images from the plurality of images:
iteratively computing interest points for the object based on photometric augmentation applied to the image before each iteration of computing the interest points, wherein the photometric augmentation comprises:
performing a Scale Invariant Feature Transform (SIFT) operation on the image;
generating a digital representation of the region and the object based on interest points that repeat across the plurality of images after each application of the photometric augmentation;
determining, based on the digital representation, a set of anchor points from the interest points that repeat across the plurality of images; and
using the set of anchor points, detecting an absence of the object in the area of the property or a continued presence of the object in the area of the property.

2. The method of claim 1, wherein determining a set of anchor points comprises:
determining a respective set of descriptors for each anchor point in the set of anchor points, wherein each respective set of descriptors represents a local region around an interest point from which the corresponding anchor point was determined.

3. The method of claim 2, wherein determining a set of anchor points from the interest points that repeat across the plurality of images comprises:
computing a respective probability value for each of the interest points that repeat across the plurality of images;
aggregating interest points having a respective probability value that exceeds a threshold probability value; and
determining the set of anchor points based on the aggregated interest points.

4. The method of claim 2, further comprising:
determining a first bag of descriptors representing a first local region around a first anchor point for a first image of the area; and
determining a second bag of descriptors representing a second local region around a second anchor point for a second image of the area.

5. The method of claim 4, further comprising:
generating a first representation subspace for the first anchor point based on the first bag of descriptors; and
generating a second representation subspace for the second anchor point based on the second bag of descriptors.

6. The method of claim 5, wherein detecting the absence or continued presence of the object at the property comprises:
performing feature matching across the first representation subspace and the second representation subspace;
computing a distance value that characterizes a detected feature match between corresponding descriptors of the first representation subspace and the second representation subspace; and
detecting the absence or continued presence of the object at the property based on the computed distance value.

7. The method of claim 2, wherein detecting the absence or continued presence of the object at the property comprises:
detecting presence or absence of the object based on the set of anchor points and the set of descriptors for each anchor point in the set of anchor points.

8. The method of claim 1, wherein performing the SIFT operation on the image comprises augmenting a plurality of attributes of the image, including augmenting attributes of the object and one or more items depicted in the image.

9. The method of claim 1, wherein iteratively computing interest points for the object based on photometric augmentation comprises:
generating a plurality of representations of the image based on the augmenting of the plurality of attributes of the image; and
identifying a subset of features of the image that are repeated across the plurality of representations irrespective of the augmentation performed on the image.

10. A system comprising a processing device and non-transitory machine-readable storage medium storing instructions that are executable by the processing device to cause performance of operations comprising:
maintaining a plurality of images that were generated while monitoring an area of a property;
detecting, using at least some of the plurality of images, an object in a region of interest in the area;
for at least some images from the plurality of images:
iteratively computing interest points for the object based on photometric augmentation applied to the image before each iteration of computing the interest points, wherein the photometric augmentation comprises:
performing a Scale Invariant Feature Transform (SIFT) operation on the image;
generating a digital representation of the region and the object based on interest points that repeat across the plurality of images after each application of the photometric augmentation;
determining, based on the digital representation, a set of anchor points from the interest points that repeat across the plurality of images; and
using the set of anchor points, detecting an absence of the object in the area of the property or a continued presence of the object in the area of the property.

11. The system of claim 10, wherein determining a set of anchor points comprises:
determining a respective set of descriptors for each anchor point in the set of anchor points, wherein each respective set of descriptors represents a local region around an interest point from which the corresponding anchor point was determined.

12. The system of claim 11, wherein determining a set of anchor points from the interest points that repeat across the plurality of images comprises:
    computing a respective probability value for each of the interest points that repeat across the plurality of images;
    aggregating interest points having a respective probability value that exceeds a threshold probability value; and
    determining the set of anchor points based on the aggregated interest points.

13. The system of claim 11, wherein the operations further comprise:
    determining a first bag of descriptors representing a first local region around a first anchor point for a first image of the area; and
    determining a second bag of descriptors representing a second local region around a second anchor point for a second image of the area.

14. The system of claim 13, wherein the operations further comprise:
    generating a first representation subspace for the first anchor point based on the first bag of descriptors; and
    generating a second representation subspace for the second anchor point based on the second bag of descriptors.

15. The system of claim 14, wherein detecting the absence or continued presence of the object at the property comprises:
    performing feature matching across the first representation subspace and the second representation subspace;
    computing a distance value that characterizes a detected feature match between corresponding descriptors of the first representation subspace and the second representation subspace; and
    detecting the absence or continued presence of the object at the property based on the computed distance value.

16. The system of claim 11, wherein detecting the absence or continued presence of the object at the property comprises:
    detecting presence or absence of the object based on the set of anchor points and the set of descriptors for each anchor point in the set of anchor points.

17. The system of claim 10, wherein iteratively computing interest points for the object based on photometric augmentation comprises:
    for each image of the plurality of images:
        augmenting, during the SIFT operation, a plurality of attributes of the image, including augmenting attributes of the object and one or more items depicted in the image.

18. The system of claim 17, wherein iteratively computing interest points for the object based on photometric augmentation comprises:
    generating a plurality of representations of the image based on the augmenting of the plurality of attributes of the image; and
    identifying a subset of features of the image that are repeated across the plurality of representations irrespective of the augmentation performed on the image.

19. A non-transitory machine-readable storage medium storing instructions that are executable by a processing device to cause performance of operations comprising:
    maintaining a plurality of images that were generated while monitoring an area of a property;
    detecting, using at least some of the plurality of images, an object in a region of interest in the area;
    for at least some images from the plurality of images:
        iteratively computing interest points for the object based on photometric augmentation applied to the image before each iteration of computing the interest points, wherein the photometric augmentation comprises:
        performing a Scale Invariant Feature Transform (SIFT) operation on the image;
    generating a digital representation of the region and the object based on interest points that repeat across the plurality of images after each application of the photometric augmentation;
    determining, based on the digital representation, a set of anchor points from the interest points that repeat across the plurality of images; and
    using the set of anchor points, detecting an absence of the object in the area of the property or a continued presence of the object in the area of the property.

* * * * *